United States Patent Office 2,733,264
Patented Jan. 31, 1956

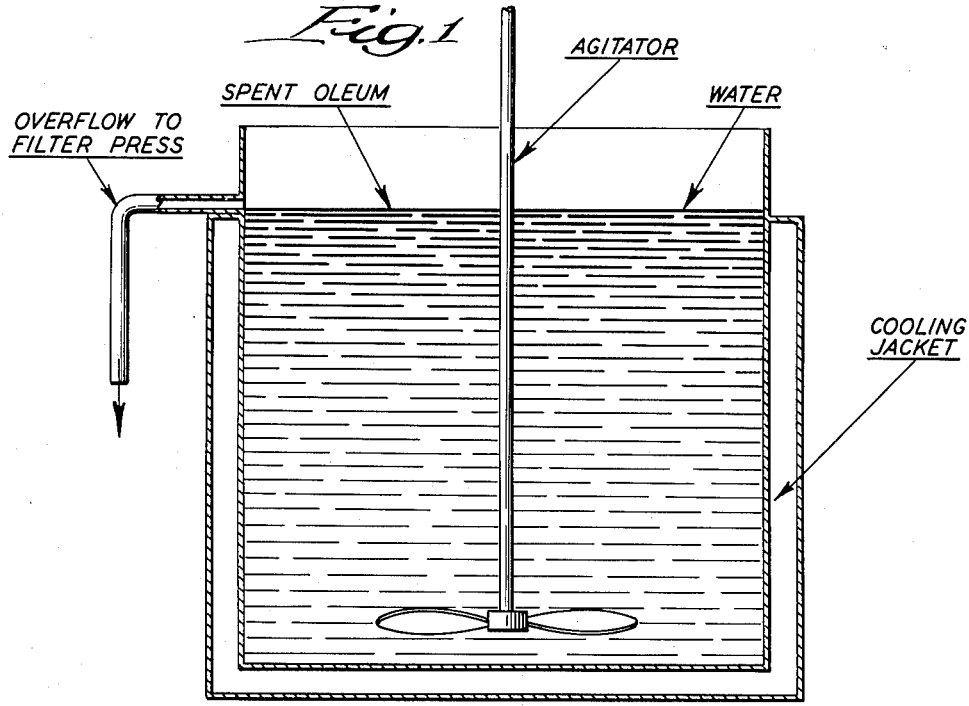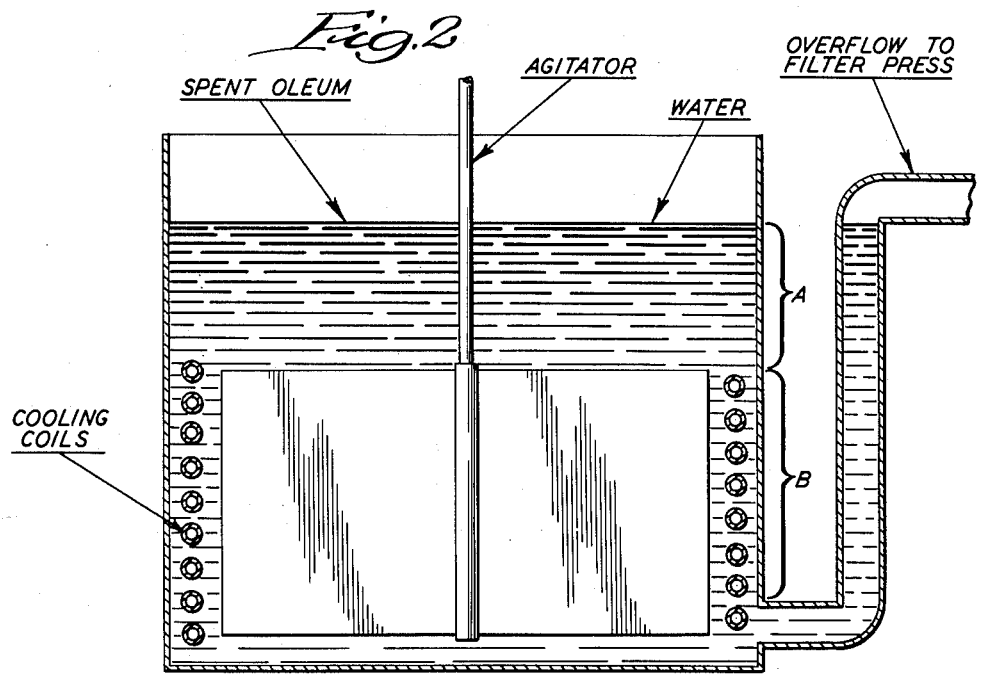

2,733,264

METHOD FOR SEPARATING AROMATIC SULFONIC ACIDS

Herbert C. Wohlers and Loren E. Pauling, St. Louis, and Frank N. Grover, Jr., Alma, Mich., assignors to Michigan Chemical Corporation, St. Louis, Mich., a corporation of Michigan Application August 21, 1952, Serial No. 305,598

14 Claims. (Cl. 260—505)

This invention relates to the separation of aromatic sulfonic acids capable of being precipitated by water dilution from concentrated sulphuric acid and it relates more particularly to the separation of p-chlorobenzenesulfonic acid as the monohydrate from spent oleum resulting from the manufacture of DDT.

While description herein will be concerned chiefly with the separation of p-chlorobenzenesulfonic acid monohydrate from spent oleum, it will be understood that the concepts are capable of similar application in the separation of other aromatic sulfonic acids and derivatives having limited solubility in sulphuric acid and as are capable of precipitation therefrom by water addition.

In the synthesis of DDT by reaction of monochlorobenzene with chloral in the presence of oleum, one of the principal impurities formed results from the reaction of monochlorobenzene with oleum to produce p-chlorobenzenesulfonic acid which is relatively soluble in concentrated sulphuric acid. When the sulfonic acid is eliminated from the spent oleum, a sulphuric acid of 70-75 percent $H_2SO_4$ is secured which is of sufficient purity to enable subsequent use in a number of commercial applications and is termed purified spent oleum. In addition, the recovered aromatic sulfonic acid is capable of a number of uses as a final product or as an intermediate in the manufacture of various compounds such as surface active agents and the like.

p-Chlorobenzenesulfonic acid monohydrate is soluble only to the extent of about 0.5-1.0 percent in 72-75 percent $H_2SO_4$ at 30° C. To effect separation of the p-chlorobenzenesulfonic acid from spent oleum, water is added in amounts to produce the monohydrate which then crystallizes out in the form of a firm mass of intermeshed needles upon slow cooling. One of the principal disadvantages of a system of the type described to effect such separation and purification resides in the character of the crystals formed whereby they become so closely packed and intermeshed as to entrap almost all of the sulphuric acid and form a solid mass requiring disintegrating means for breakdown into units capable of handling. In addition, the slurry that is formed after mechanically breaking up the intermeshed mass is of such high viscosity as to prevent handling or processing in a simple and economical manner. Viscous slurries produced by processes of the type described wherein water is mixed directly with spent oleum followed by cooling and breaking up form filter cakes containing a maximum of about 50 percent p-chlorobenzenesulfonic acid monohydrate and a minimum of about 35 percent sulphuric acid, the balance being water.

It is an object of this invention to provide a new and improved method for the separation of aromatic sulfonic acids from sulphuric acid or spent oleum and it is a related object to produce sulphuric acid and aromatic sulfonic acids by separation therefrom in sufficient purity to enable subsequent utilization.

Another object is to provide a process wherein aromatic sulfonic acids can be easily, quickly and economically separated from spent oleum by continuous or by batch operation.

A further object is to provide a new and economical process wherein p-chlorobenzenesulfonic acid monohydrate can be separated from spent oleum without causing the formation of soupy and high viscosity slurries that are difficult to handle.

A still further object is to provide a process of the type described wherein the aromatic sulfonic acid component is precipitated in the form of individual, fairly large needle-like crystals which permit easy and substantially complete separation from the sulphuric acid solution and it is a related object to provide a process of the type described which may be adapted for continuous operation.

These and other objects and advantages of this invention will hereinafter appear and for purposes of illustration, but not of limitation, reactors for use in the practice of this invention are shown in the accompanying drawing in which—

Figure 1 schematically illustrates a reactor for use in the practice of this invention, and Figure 2 schematically illustrates a modification in a reactor of the type shown in Figure 1 adapted for continuous operation.

For purposes of explanation, a typical analysis of spent oleum resulting from the synthesis of DDT by reaction of monochlorobenzene with chloral in the presence of oleum will contain about 72 percent by weight $H_2SO_4$, 25 percent by weight p-chlorobenzenesulfonic acid and 3 percent by weight of miscellaneous materials such as water, DDT and the like. Upon dilution with water to form the monohydrate and to precipitate the monohydrate from the sulphuric acid solution, the slurry that is formed will contain about 58 percent $H_2SO_4$, 22 percent by weight p-chlorobenzenesulfonic acid monohydrate, 17.5 percent water and 2.5 percent of other miscellaneous materials. When all but the limited amount of p-chlorobenzenesulfonic acid monohydrate soluble in 72-75 percent $H_2SO_4$ is removed, the resulting acid will contain about 74 percent $H_2SO_4$, 23 percent water and 3 percent miscellaneous materials. The problem, however, resides in the handling of the slurry because of its high viscosity and in the difficulty of separating the p-chlorobenzenesulfonic acid monohydrate crystals from the sulphuric acid solution in an efficient and economical manner.

Various techniques have been tried, most of them being directed to the crystallization of the sulfonic acid monohydrate crystals of increased size whereby more fluid slurry and more easily separable precipitate might be formed. Such modifications in processing techniques have included slow dilution with water to encourage crystal growth; aging of the spent oleum, or heating prior to the addition of water for precipitation; and various combinations of extraction and heating were tried but with little success. In practically every instance, sooner or later the slurry formed into the usual soupy mass of high viscosity from which crystal separation became difficult.

Dilution of the concentration of p-chlorobenzenesulfonic acid by the addition of purified spent oleum (about 74 percent $H_2SO_4$) prior to water addition or in combination therewith was also tried in the attempt to increase crystal size, but even with rigid temperature control, little improvement was secured in the product formed. Other modifications were made in the procedural steps such as in mixing and in certain pretreatments of the spent oleum but with substantially the same result.

It has been found that a critical relationship exists whereby the water can be combined with the spent oleum in a manner to produce individual and fairly large needle-like crystals of p-chlorobenzenesulfonic acid monohydrate with the result that the slurry formed is of a viscosity that can be readily handled and from which the crystals of the monohydrate can be separated by conventional means to produce a relatively pure product and leave a relatively pure filtrate in the form of sulphuric acid capable of use in other applications. To achieve the desired result, it has been found necessary to pour the spent oleum and water in the desired ratio in admixture together or separately into a slurry containing seed crystals and at a rate and under conditions which maintain the temperature of the slurry preferably within a range of 35–45° C. The slurry may then be allowed to cool to a lower temperature. In the event that the water dilution is allowed to take place for crystallization at a temperature below 25° C., very finely divided small crystals or granules are formed and the resulting slurry acquires a very high and undesirable consistency which is most difficult to handle. Temperatures in excess of 45° C. may be used for crystallization but it is necessary to keep below the temperature at which the aromatic sulfonic acid becomes miscible with the diluted sulphuric acid. With p-chlorobenzenesulfonic acid monohydrate the temperature should not be permitted to exceed about 55–60° C.

The rate of addition of the spent oleum and water to the seeded slurry may be varied consistent with the ability to maintain control of the temperature below the critical temperature level and preferably below 45° C. and above 25° C. Thus the combination of additions may be made as slowly as desirable but, it has been found that upon addition of water and oleum in amounts corresponding to about 25–50 percent of the reactor volume per hour, a temperature in the region of 25–45° C. can be accurately maintained. Where higher temperature levels are possible, the rate of addition may be increased to about 100–150 percent of the reactor volume per hour, but it is greatly preferred to maintain a rate of flow corresponding to between 25–50 percent of the reactor volume per hour.

Under these controlled conditions, the p-chlorobenzenesulfonic acid monohydrate crystallizes out in the form of individual needle-like crystals which are not intermeshed and are capable of easy separation from the slurry and the slurry that is formed is of fluid consistency enabling easy handling by usual processing equipment. The crystals can be separated from the slurry by filtration, by decantation or by centrifugal separation to form a cake containing at least 78 percent p-chlorobenzenesulfonic acid monohydrate, less than 12 percent by weight sulphuric acid with the remainder being mostly water. This is to be compared to the cake formed in accordance with the previous practice containing less than 50 percent of the aromatic sulfonic acid and at least 35 percent sulphuric acid.

For purposes of illustration, description will follow of various techniques embodying features of this invention for the purification of sulphuric acid and simultaneous separation of p-chlorobenzenesulfonic acid monohydrate from spent oleum of DDT manufacture containing on the average about 72 percent $H_2SO_4$, 25 percent p-chlorobenzenesulfonic acid, and 3 percent miscellaneous compounds including water, DDT and the like.

*Example 1*

Spent oleum was diluted with 1–2 parts by weight of purified spent oleum to 1 part by weight spent oleum and an amount of water was added to constitute 20–25 parts by weight water to 70–75 parts by weight spent oleum. The mixture was maintained at a temperature of about 75° C. to prevent any crystal formation or separation of the p-chlorobenzenesulfonic acid monohydrate and then the mixture was poured at a volume velocity of about 25 percent per hour per reactor volume into a seed slurry maintained at a temperature of about 45° C. Agitation was continued with cooling until a temperature of about 35° C. was reached. The p-cholorobenzenesulfonic acid monohydrate formed into individual needle-like crystals which were easily separated from the slurry by filtration or by centrifuging to produce a crystal cake containing less than 12 percent sulphuric acid and to produce a filtrate containing about 75 percent $H_2SO_4$, 22.5 percent water and about 2.5 percent miscellaneous materials. A small amount of the slurry containing the desired crystal structure was reserved for use as the seed mixture in the next crystallization-purification step. If the reaction temperature is permitted to fall below 25° C., even with constant agitation, the undesirable thick soupy slurry forms with its corresponding difficulty in handling and separation of the solids therein.

*Example 2*

With reference to Figure 1 of the drawing, spent oleum of the composition referred to in Example 1 and water in amount of about 20–25 parts by weight to 70–75 parts by weight spent oleum are simultaneously introduced into a jacketed reactor containing a seed mixture. The content material is maintained in a constant state of agitation by the stirrer and cold water or other refrigerant is circulated through the jacket to maintain the temperature of the slurry within the reactor between 35–45° C. As previously pointed out, the container is initially provided with a seed mixture comprising a slurry already having the p-chlorobenzenesulfonic acid monohydrate crystallized out.

Additions of water and spent oleum are made at a volumetric velocity of about 50 percent of the reactor volume per hour and the slurry overflows at an equal rate through an overflow pipe to separating means such as a filter press or centrifugal separator. The process described provides for continuous operation. The overflow is of good liquid consistency to enable fluid flow to the desired separating means and the individual needle-like crystals of p-chlorobenzenesulfonic acid monohydrate can be easily and economically removed to produce a useful product and a reusable purified acid.

In order to minimize the amount of p-chlorobenzenesulfonic acid monohydrate remaining to crystallize out of the sulphuric acid filterate upon cooling, it has been the practice to permit the slurry to cool to a temperature of about 25° C., so that practically all of the p-chlorobenzenesulfonic acid monohydrate will be removed before centrifuging or filtering. Crystallization in the filtrate can also be effectively prevented by feeding the reactor effluent to a cooled retention tank maintained at a temperature of about 25° C. or less for purposes of completing crystallization at a faster rate before separation.

The need for a cooling period or a separate cooling retention tank may be eliminated and the reactor effluent promptly centrifuged when the reactor is constructed in accordance with the illustration in Figure 3.

*Example 3*

In this reactor, the agitator is of the paddle or basket type submerged a considerable distance below the level of the slurry so as to cause intermixing of the slurry at the level corresponding to the agitator but with less intermixing with the material thereabove. Thus the reactor is divided into a lower low temperature zone B and an upper high temperature zone A. Within the low temperature zone, a plurality of cooling coils are provided through which cold water or other refrigerant is circulated to lower the slurry to a temperature below 35° C. and preferably to about 25° C. prior to its passage through the outlet at the lower end of the reactor to separating means. Spent oleum and water in the defined proportions, separately as in Example 2, or in admixture, are introduced to the reactor at a rate of about 25–50 percent of the reactor volume per hour. The material in the high temperature zone is maintained at a temperature above 35° C. and preferably within a range of about 40–50° C. to effect the desired crystal formation and then, as the slurry is displaced downwardly through the reactor and into the agitated zone to the outlet, the temperature thereof is slowly reduced from the higher temperature at the top to about 25° C. at the bottom. Under the temperature conditions existing, crystallization continues to take place while the temperature of the slurry at the discharge is slightly above 25° C. to complete the crystallization and separation of the p-chlorobenzenesulfonic acid monohydrate from sulphuric acid.

Where the concentration of p-chlorobenzenesulfonic acid is of such high concentration to load the slurry in a manner to prevent efficient handling, some of the purified spent oleum or filtrate may be recycled through the system to dilute the solids content.

It will be apparent from the description that there is provided a new and improved process which enables the separation of aromatic sulfonic acids from sulphuric acid in a manner which permits the formation of crystals in a slurry that remains of liquid consistency and of a size which permits easy and clean separation from the filtrate. Thus aromatic sulfonic acids can be separated from sulphuric acid solution in which they are manufactured or in which they are formed as a by-product in the manufacture of other substances to produce a more useful and more desirable material and to permit separation in a more economical manner.

As used herein, the term "aromatic sulfonic acid" is meant to include compounds wherein the aromatic group attached to the sulfonic acid group may contain alkyl groups substituted on the aromatic nucleus.

It will be understood that changes may be made in the details of operations and methods of handling the materials without departing from the spirit of the invention, especially as defined in the following claims.

We claim:

1. The method of separating from solution in sulphuric acid, aromatic sulfonic acids which are soluble in the sulphuric acid of high $H_2SO_4$ concentration and which are precipitated therefrom upon dilution with water, comprising the steps of introducing the sulphuric acid solution of the aromatic sulfonic acid compound into a seed mixture having the aromatic sulfonic acid compound precipitated therein to form crystals and with water sufficient to dilute the sulphuric acid to the point where the amount of aromatic sulfonic acids present are in excess of that which is soluble in the diluted sulphuric acid, and maintaining the mixture at a temperature above 25° C. but below the temperature at which the aromatic sulfonic acid compound is miscible with the sulphuric acid solution until the aromatic sulfonic acid compound crystallizes out to form a slurry of liquid consistency.

2. The method of separating aromatic sulfonic acids as crystals from solution in sulphuric acid and from which said aromatic sulfonic acids are separable as crystals upon dilution with water to form the corresponding monohydrate, comprising the steps of introducing the solution of sulphuric acid and aromatic sulfonic acid compound into a slurry having the aromatic sulfonic acid compound precipitated therein to form seed crystals and with water sufficient to cause precipitation of aromaitc sulfonic acids insoluble in the diluted sulphuric acid solution, and maintaining the mixture at a temperature above 25° C. but below 60° C. whereby the aromatic sulfonic acid compound crystallizes out to form a slurry of fluid consistency.

3. The method of separating aromatic sulfonic acids from solution in concentrated sulphuric acid from which the aromatic sulfonic acids are precipitated as crystals upon dilution with water, comprising the steps of adding the solution of the aromatic sulfonic acid compound in sulphuric acid to a slurry in which the aromatic sulfonic acid compound has been precipitated to form seed crystals and with water sufficient to dilute sulphuric acid and cause precipitation of aromatic sulfonic acids from the sulphuric acid solution under the conditions existing, and maintaining the mixture at a temperature between 35–45° C. whereby the aromatic sulfonic acid compound crystals formed are separated and are of relatively large dimensions in a slurry from which the crystals are easily separable.

4. The method as claimed in claim 3 in which the slurry containing the mixture of seed crystals and solution of sulphuric acid and aromatic sulfonic compound with water added thereto is constantly agitated during crystal formation.

5. The method as claimed in claim 3 in which the water and solution of the aromatic sulfonic acid compound in sulphuric acid is added in a volumetric velocity equivalent to 25–50 percent per hour of the volume of the reactor in which the mixture is contained to form the crystals.

6. The method of separating p-chlorobenzenesulfonic acid from solution in sulphuric acid, comprising adding the solution with water in amounts corresponding to 20–25 parts by weight per 70–75 parts by weight $H_2SO_4$ to a slurry containing p-chlorobenzenesulfonic acid monohydrate precipitated out as seed crystals, and maintaining the temperature of the formed slurry above 25° C. but below the temperature at which the p-chlorobenzenesulfonic acid monohydrate is miscible with the sulphuric acid solution.

7. The method of separating p-chlorobenzenesulfonic acid from solution in spent oleum, comprising adding the solution with water in amounts to provide a ratio of 20–25 parts by weight of water to 70–75 parts by weight of sulphuric acid and at a temperature capable of maintaining the p-chlorobenzenesulfonic acid in solution to a mixture containing seed crystals of p-chlorobenzenesulfonic acid in sulphuric acid and maintaining the formed slurry at a temperature between 25–60° C. wherein the p-chlorobenzenesulfonic acid crystallizes out in a form easily separable from the slurry.

8. The method as claimed in claim 7 in which the solution of p-chlorobenzenesulfonic acid in sulphuric acid and water is added in amounts corresponding to 25–50 percent of the reactor volume per hour in which crystallization is carried out.

9. The method as claimed in claim 7 in which the slurry mixture is maintained under constant agitation until crystal formation and separation.

10. The method of separating p-chlorobenzenesulfonic acid from solution in spent oleum, comprising adding the solution with water in amounts to provide a ratio of 20–25 parts by weight of water to 70–75 parts by weight of sulphuric acid to a mixture containing seed crystals of p-chlorobenzenesulfonic acid in sulphuric acid and maintaining the formed slurry at a temperature between 35–45° C. wherein the p-chlorobenzenesulfonic acid crystallizes out in a form easily separable from the slurry.

11. The method of separating p-chlorobenzenesulfonic acid from spent oleum resulting from the manufacture of DDT by reaction of monochlorobenzene with chloral in oleum, comprising the steps of adding the spent oleum with water in amounts to give a weight ratio of 20–25 parts by weight of water to 70–75 parts by weight of sulphuric acid to a seed mixture containing p-chlorobenzenesulfonic acid monohydrate crystals precipitated out in sulphuric acid, maintaining the slurry mixture formed by the addition of the spent oleum and water at a temperature between 25–45° C. and under a constant state of agitation whereby the p-chlorozenzenesulfonic acid monohydrate crystallizes out in a form incapable of reducing the slurry to soupy consistency.

12. The method for separating p-chlorobenzensulfonic acid from spent oleum resulting from the reaction of monochlorobenzene with oleum, comprising the steps of adding the oleum with water in amounts to give a weight ratio of water to $H_2SO_4$ within the range of 20–25 parts by weight of water to 70–75 parts by weight of sulphuric acid to a seed mixture containing the crystals of the p-chlorobenzenesulfonic acid monohydrate precipitated out in sulphuric acid solution, adding the spent oleum and water to the seed mixture in a reactor at a rate corresponding to 25–50 percent of the reactor volume per hour, maintaining the temperature within the reactor between 25–45° C. whereby the p-chlorobenzenesulfonic acid monohydrate crystallizes out in the form of relatively large separate needle-like crystals capable of easy separation from the slurry.

13. The method for separating aromatic sulfonic acid compounds from spent oleum resulting from the reaction of aromatic compounds with oleum, comprising the steps of adding the oleum with water in amounts to give a weight ratio of water to $H_2SO_4$ within the range of 20–25 parts by weight of water to 70–75 parts by weight of sulphuric acid to a seed mixture containing the crystals of the aromatic sulfonic acid hydrate precipitated out in sulphuric acid solution, adding the spent oleum and water to the seed mixture in a reactor at a rate corresponding to 25–50 percent of the reactor volume per hour, maintaining the temperature within the reactor between 25–45° C. whereby the aromatic sulfonic acid hydrate crystallizes.

14. The method of separating aromatic sulfonic acids from solution in concentrated sulphuric acid from which the aromatic sulfonic acids are precipitated as crystals upon dilution with water, comprising the steps of adding the solution of the aromatic sulfonic acid compound in sulphuric acid to a slurry in which the aromatic sulfonic acid compound has been precipitated to form seed crystals and with water to provide a ratio of 20–25 parts by weight of water to 70–75 parts by weight of sulphuric acid, and maintaining the mixture at a temperature above 25° C. but below the temperature where the aromatic sulfonic acid compound is miscible with the sulphuric acid solution whereby the aromatic sulfonic acid compound crystallizes into crystals of relatively large dimension in a slurry from which the crystals are easily separable.

References Cited in the file of this patent

UNITED STATES PATENTS

| | | |
|---|---|---|
| 1,402,318 | Rodebush | Jan. 3, 1922 |
| 1,671,586 | Horwitz | May 29, 1928 |
| 2,057,100 | Jespersen | Oct. 13, 1936 |
| 2,460,865 | Wilson | Feb. 8, 1949 |
| 2,463,653 | Sveda | Mar. 8, 1949 |
| 2,568,154 | Hill et al. | Sept. 18, 1951 |

OTHER REFERENCES

Mosher et al.: J. Industrial and Engineering Chemistry, vol. 38, No. 9, pp. 916–923 (1946).